US009253077B2

(12) United States Patent
Chang et al.

(10) Patent No.: US 9,253,077 B2
(45) Date of Patent: Feb. 2, 2016

(54) PARALLEL TOP-K SIMPLE SHORTEST PATHS DISCOVERY

(71) Applicant: International Business Machines Corporation, Armonk, NY (US)

(72) Inventors: Yuan-Chi Chang, Armonk, NY (US); Mustafa Canim, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 13/690,282

(22) Filed: Nov. 30, 2012

(65) Prior Publication Data

US 2014/0156826 A1 Jun. 5, 2014

(51) Int. Cl.
*H04L 12/721* (2013.01)

(52) U.S. Cl.
CPC .................................... *H04L 45/12* (2013.01)

(58) Field of Classification Search
CPC ....................................................... H04L 45/12
USPC ......................................................... 709/224
See application file for complete search history.

(56) References Cited

U.S. PATENT DOCUMENTS

| 7,420,923 B2 | 9/2008 | Helgesen |
| 2005/0267940 A1 | 12/2005 | Galbreath et al. |
| 2007/0086358 A1* | 4/2007 | Thubert et al. ................ 370/254 |
| 2011/0172956 A1 | 7/2011 | Nakadai |
| 2012/0254333 A1* | 10/2012 | Chandramouli et al. ..... 709/206 |

FOREIGN PATENT DOCUMENTS

WO 2011015057 A1 2/2011

OTHER PUBLICATIONS

Jin Y. Yen, "Finding the K Shortest Loopless Paths in a Network," Management Science, Jul. 1971, pp. 712-716, vol. 17, No. 11, INFORMS.
Michael J. Quinn and Narsingh Deo, "Parallel Graph Algorithms," Computing Surveys, Sep. 1984, pp. 319-348, vol. 16, No. 3, Computer Science Dept., Washington State University, Pullman, WA.
David Eppstein, "Finding the k Shortest Paths," Mar. 1997, pp. 1-26, Department of Information and Computer Science, University of California, Irvine, CA.

* cited by examiner

*Primary Examiner* — Vivek Srivastava
*Assistant Examiner* — Sibte Bukhari
(74) *Attorney, Agent, or Firm* — Nidhi Garg, Esq.; Otterstdt, Ellenbogen & Kammer, LLP

(57) ABSTRACT

A method for searching the top-K simple shortest paths between a specified source node and a specified target node in a graph, with graph data partitioned and distributed across a plurality of computing servers, the method including a parallel path search initialized from either one or both of the source and target nodes and traversing the graph by building likely path sequences for a match. Each computing server determines and forwards a path sequence as discovery progresses until the top-K paths are discovered.

30 Claims, 11 Drawing Sheets

| Edge origin | Edge destination | Edge weight | Edge attributes |
|---|---|---|---|
| N10 | N20 | 11 | 12/10/2011 |
| N10 | N24 | 17 | 12/12/2011 |
| N20 | N30 | 19 | 12/12/2011 |
| N24 | N40 | 23 | 12/12/2011 |
| N30 | N40 | 13 | 12/23/2011 |
| N32 | N30 | 37 | 12/28/2011 |

Query: top-2 paths from A to H

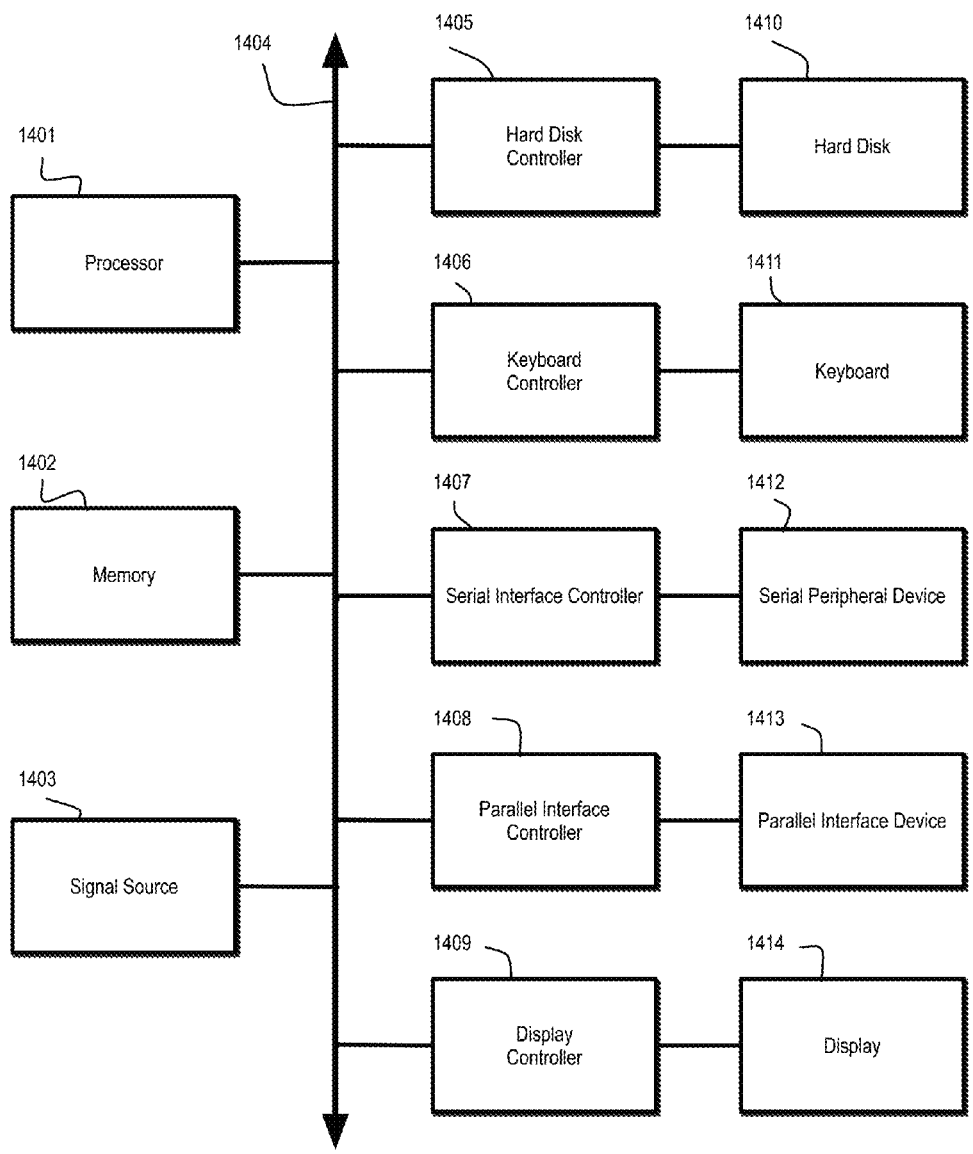

PARALLEL TOP-K SIMPLE SHORTEST PATHS DISCOVERY

This invention was made with Government support under Contract No.: W911NF-11-C-0200 (Defense Advanced Research Projects Agency (DARPA)). The Government has certain rights in this invention.

BACKGROUND

The present invention relates generally to query techniques, and more particularly, to query techniques for detecting top-K simple shortest paths in a graph.

Large scale graph data is widely represented in problems in scientific and engineering disciplines. For example, the problems of shortest path and top-K shortest paths appear in the context of finding connections between friends, tracing money routes, linking seemingly disconnected criminal activities, etc. These problems have applications in a variety of fields, including large scale networks such as the world wide web and online social networks, which pose challenges in managing and querying graph data formulated as interactions between people, servers and entities.

BRIEF SUMMARY

According to an embodiment of the present disclosure, a method for determining a portion of a path in a distributed network of nodes between a source node and a target node, wherein graph data representing a portion of a topology of the distributed network of nodes is stored by a computing server, includes receiving a batch of incomplete path sequences between the source node and the target node and a current cutoff threshold, updating the current cutoff threshold upon determining that a local cutoff threshold of the computing server is less than the current cutoff threshold, wherein the current cutoff threshold is updated to take a value of the local cutoff threshold, removing each of the incomplete path sequences containing a loop from the batch of incomplete path sequences to determine an updated batch, appending a looked up edge to the updated batch upon determining that a total path weight of the updated batch is less than the current cutoff threshold to determine an appended batch, and outputting the updated batch to at least one additional computing server storing graph data representing an additional portion of the topology of the distributed network of nodes.

According to an embodiment of the present disclosure, a method for determining a path in a distributed network of nodes, wherein graph data representing a topology of the distributed network of nodes is partitioned and stored among a plurality of computing servers connected via communication switches, includes initializing a search, in response to a query at a source node, at an initial computing server storing a portion of the graph data corresponding to the source node, determining, by the plurality of computing servers, a plurality of path sequences forming the path between the source node and a target node, each of the plurality of computing servers, excluding a terminating computing server, determining at least one path sequence between at least two immediate neighboring nodes along the path, and sending the at least one path sequence to at least one additional computing server of the plurality of computing servers storing a respective portion of the graph data between the source node toward the target node upon determining that a path weight of the at least one path sequence is smaller than a cutoff threshold, and determining, by the terminating computing server, at least one path sequence directly to the target node given the at least one path sequence of at least one previous computing server.

According to an embodiment of the present disclosure, a method for determining a top-K simple shortest path in a distributed network of nodes, wherein graph data representing a topology of the distributed network of nodes is partitioned and stored among a plurality of computing servers connected via communication switches, includes receiving a query at a source node, initializing a search in response to the query at an initial computing server storing a portion of the graph data corresponding to the source node, determining at least one path sequence directly from the source node to its direct, immediate neighboring nodes, and sending the at least one path sequence to at least one additional computing server storing a respective portion of the graph data between the source node toward a target node upon determining that a path weight of the at least one path sequence is smaller than a cutoff threshold. For each additional computing server, in parallel, the method can include receiving a batch of incomplete path sequences including the at least one path sequence and a current cutoff threshold, updating the current cutoff threshold upon determining that a local cutoff threshold of the at least one additional computing server is less than the current cutoff threshold, wherein the current cutoff threshold is updated to take a value of the local cutoff threshold, removing each of the incomplete path sequences containing a loop from the batch of incomplete path sequences to determine an updated batch, appending a looked up edge to the updated batch upon determining that a total path weight of the updated batch is less than the current cutoff threshold to determine an appended batch, updating a top-K list of path sequences upon determining that the path sequences of the appended batch reaches the target node, and exiting upon determining that none of the additional computing servers have more sequences to exchange and merge into the top-K list of path sequences and outputting the top-K list of path sequences.

According to an embodiment of the present disclosure, a computer program product for determining a top-K simple shortest path in a distributed network of nodes, wherein graph data representing a topology of the distributed network of nodes is partitioned and stored among a plurality of computing servers connected via communication switches, comprises computer readable program code configured to determine a top-K simple shortest path.

BRIEF DESCRIPTION OF THE SEVERAL VIEWS OF THE DRAWINGS

Preferred embodiments of the present disclosure will be described below in more detail, with reference to the accompanying drawings:

FIG. 14 is a block diagram depicting an exemplary computer system for detecting top-K simple shortest paths in a graph according to an embodiment of the present disclosure.

DETAILED DESCRIPTION

The present disclosure relates generally to query techniques for top-K simple shortest paths in a graph.

According to an exemplary embodiment of the present disclosure, a query technique employs a cluster of computing servers, each of which stores and manages a partitioned set of nodes and edges in the graph. The query technique can be considered to have data volume scalability over the cluster of computing servers. The query technique can include a parallel processing method including a distributed search of top-K shortest paths conducted among the computing servers. Messages can be exchanged among the computing servers asynchronously as the local findings converge to a result. The computing servers each include a processor, a memory, and a persistent storage space where the partitioned graph data can be stored.

According to an exemplary embodiment of the present disclosure, a top-K shortest path problem can be divided into two categories, depending on whether loops are allowed. The shortest path problem, by definition, does not include loops. A top-K shortest path may or may not include loops.

According to an exemplary embodiment of the present disclosure, a large scale graph data can be processed. The graph data represents a topology of the distributed network of nodes. The large scale graph data is partitioned and stored on multiple disks.

According to an exemplary embodiment of the present disclosure, a processing of the partitioned graph data can be distributed across multiple computing servers in parallel. The computing servers can have local access to the partitioned graph data. The computing servers can exchange messages that contain incomplete node sequences recording paths from a source query node toward a destination node. Each computing server can maintain a local top-K list of completed paths, as well as a cutoff threshold to terminate certain graph traversals, e.g., graph traversals that do not advance to a target node.

According to an exemplary embodiment of the present disclosure, parallel processing can be implemented to exchange candidate paths between the computing servers asynchronously, such that the parallel processing converges to a result. The parallel processing allows asynchronous message exchanges among the computing servers and can accelerate the convergence on the results.

Figure 1:
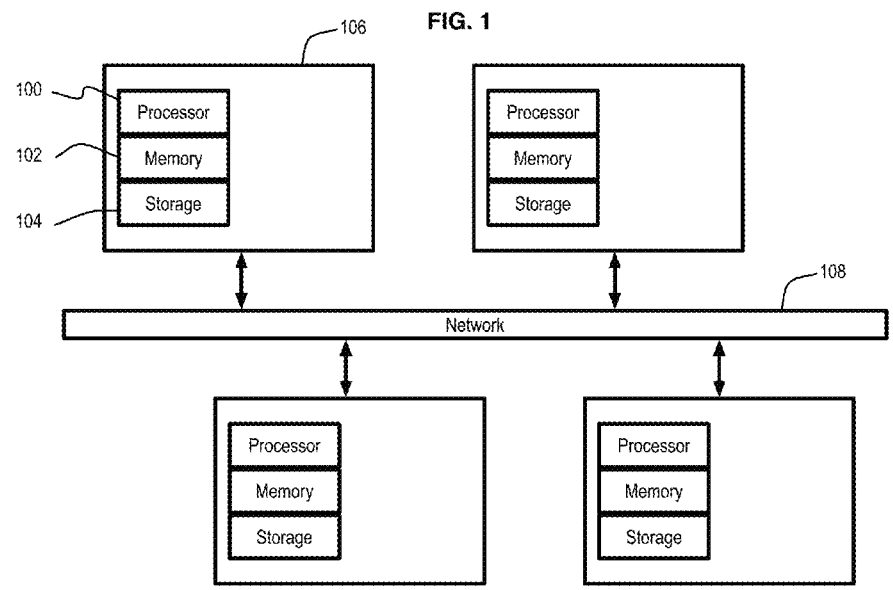
FIG. 1 is a pictorial representation of a distributed data processing system for executing methods according to an exemplary embodiment of the present disclosure.

With reference now to the figures and in particular with reference to FIG. 1, an exemplary distributed data processing system includes one or more servers such as 106, interconnected via a network 108. Each server, such as 106, includes one or more processors 100 (e.g., central processing units (CPUs)), a memory 102 and a storage device 104. Code or instructions implementing processes of exemplary embodiments can be stored in the memory 102 and executed by the processor 100. The storage devices 104 can store the instructions, as well as graph data, to be processed by the system. The graph data can be partitioned and stored across distributed servers in the system.

Figure 2:
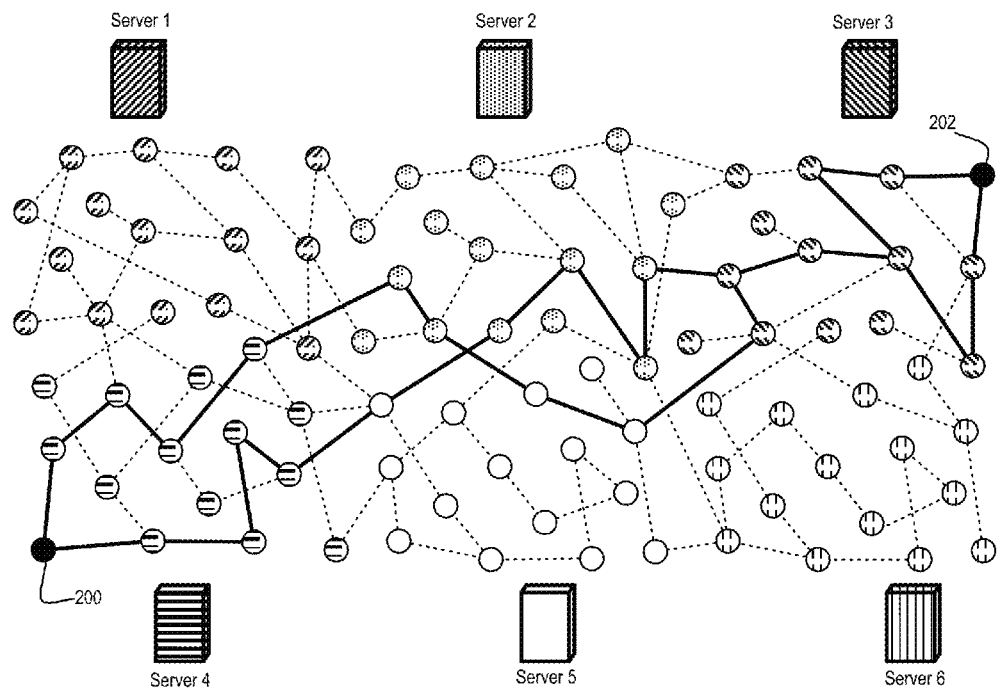
FIG. 2 depicts a top-K simple shortest path problem on very large graph data partitioned and managed by a cluster of computing servers.

Turning now to FIG. 2, an exemplary top-K simple shortest path problem is illustrated on graph data partitioned and managed by a data processing system such as that shown in FIG. 1. The top-K simple shortest path problem may be expressed as finding the K shortest, loopless paths, each of which traverses across a sequence of graph nodes connected by edges from a source node 200 to a target or destination node 202. Here, loopless means a node does not appear more than one time in a valid path. Further, shortest refers to the smallest number of hops or a smallest aggregated measure of edge weights. FIG. 2 shows a partitioned graph data, wherein the graph data is stored and managed by six servers. A set of nodes is associated with each server or computing server; the associations are illustrated by common patterns in the nodes and servers. Herein, Server 3 is referred to as an initial computing server since it stores a portion of the graph data including the source node and Server 4 is referred to as a terminating computing server since it stored a portion of the graph data including the target node.

To ensure certain data management features, including update consistency, the partitioned graph data can be assumed to be non-overlapping and non-redundant. Exemplary embodiments of the present disclosure are described based on the non-overlapping assumption. However, it should be obvious to a person skilled in the art to modify exemplary methods to address other features, such as redundant partitions of graph data, etc.

Figures 3, 4:
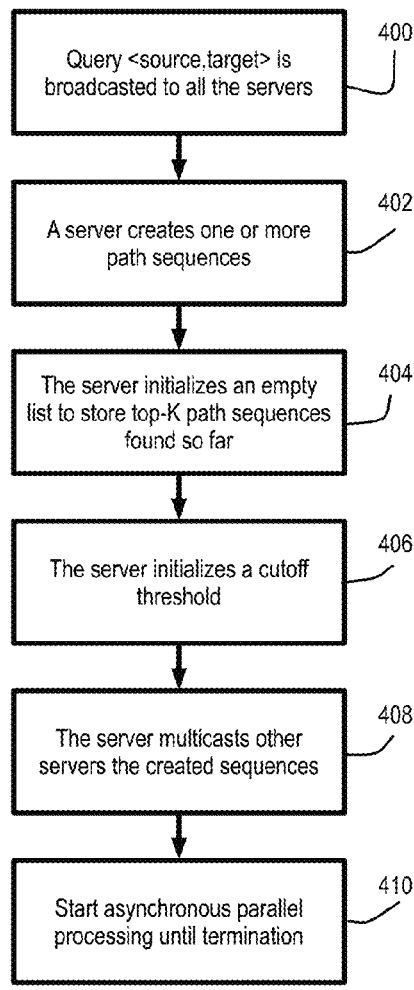
FIG. 3 depicts an adjacency list data structure encoding graph edge information according to an exemplary embodiment of the present disclosure.
FIG. 4 illustrates an initialization of a parallel method from a queried source node according to an exemplary embodiment of the present disclosure.

FIG. 3 depicts an exemplary adjacency list data structure. The adjacency list data structure encodes graph edge information. The adjacency list representation includes elements to describe a graph edge, an origin node and a destination node. Optionally, an edge can be assigned a numerical weight and other attributes such as date. An edge may be specified as directional or bi-directional. For graph data, such as web page references or social network interactions, a table such as shown in FIG. 3 may contain billions of entries and may not fit in memory or on a single server. According to an exemplary embodiment of the present disclosure, the table can be partitioned and managed by a cluster of computing servers (referred to hereinafter as servers). The table may be partitioned according to a variety of partition schemes including partitioning by origin node, destination node, both or other attributes. It can be assumed that a consistent partition scheme is applied and that each server knows what edge data the other servers manage in their local persistent storage space. For example, given an exemplary partition scheme in the form of hash partition by origin node, given a node id, any server can perform a hash partition to learn which server holds the edge data associated with the id.

Turning now to FIG. 4, a flow diagram illustrating an initialization of a parallel method from a queried source node. The queried source node and target node are broadcasted to all the servers holding the graph data at block 400. A first server, which holds the edges originating from the source node, creates one or more path sequences, representing the hops directly away from the queried source at block 402. The first server initializes an empty list to store the top-K path sequences found so far at block 404 and initializes a cutoff threshold, which is used to limit the number of paths to track, to infinity at block 406. The first server multicasts the incomplete path sequences (e.g., the first hop away from the source node) to the other servers at block 408. Herein, multicast refers to a process wherein a server is sent one or more incomplete path sequences whose last node in a path sequence is among the origin nodes of edge data the server manages. More particularly, given a node identification, any server can map the node identification to another server that holds the edge data associated with the node identification. A first server holds the edges originating from the source node so it knows the destination node identifications of these edges. From the destination node identifications, the first server can map these identifications to respective servers that hold the edge data of a second hop away from the source node. Further, not all the incomplete path sequences generated at block 402 are sent to every server. The distributed processing system starts an asynchronous parallel processing at block 410.

Figure 5:
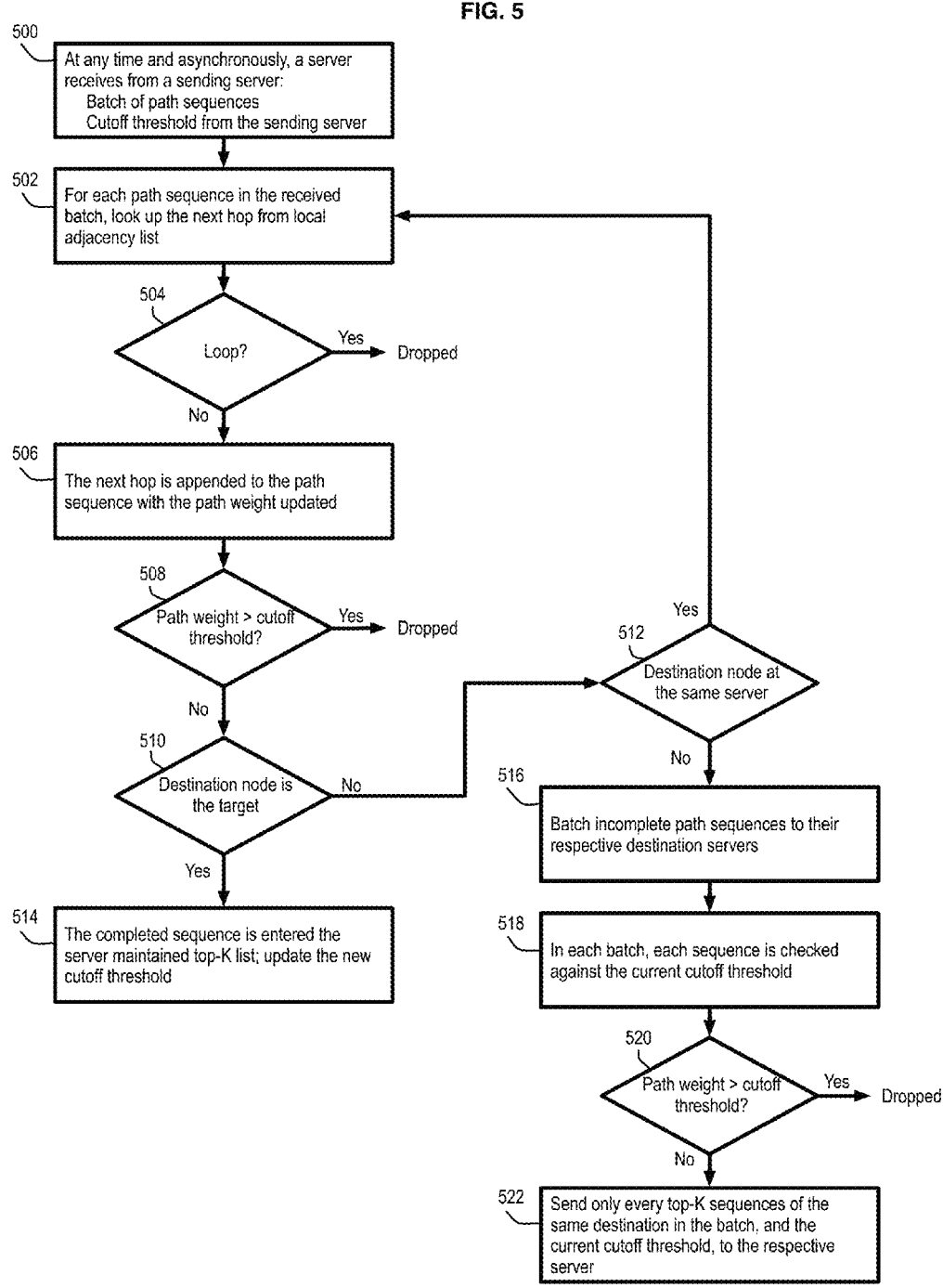
FIG. 5 illustrates an independently executed, iterative method for a computing server to append and update path sequences before exchanging them with other servers according to an exemplary embodiment of the present disclosure.

An exemplary asynchronous parallel processing among servers is described with reference to FIG. 5 and FIG. 6. According to an exemplary embodiment of the present disclosure, an asynchronous parallel processing among servers has no set order on the execution operations among servers at runtime. A server can multicast a batch of incomplete path sequences to respective servers holding the downstream data once the batch is available. While there is no fixed order of execution among parallel servers, within a server, there can be a fixed program logic. As shown in FIG. 5, at any time and asynchronously, a current server may receive a new batch of incomplete paths and a cutoff threshold from a remote sending server at block 500. The cutoff threshold of the current server is updated to be the lesser of a threshold of the current server and the cutoff threshold of the sending server.

For each incomplete path sequence in a received batch, the current server looks up a next hop (edge) from a local adjacency list that it manages at block 502. If the next hop destines to a node that has been visited before by the incomplete path, the path has formed a loop and the extended path is dropped at block 504. If not, the next hop is added at the end of the incomplete path with its aggregated weight updated at block 506. The updated path weight can be checked against the threshold and if the updated path weight is greater than the threshold, the path is dropped at block 508. That is, a path can be dropped because there are at least K other completed path sequences from the source to the target that have lower weights. At block 510, it is determined whether the destination node of the last hop is also the target node, and if so, the now completed path is entered to the server maintained top-K list. The cutoff threshold can also be updated at block 514. At block 512, if it is determined that the destination node is not the target node, but the current server manages its data, then the server continues to look up the next hop by iterating through blocks 502 to 510.

If the destination node's information is held by other servers, the current server batches the incomplete path sequences based on their next hops at block 516. To avoid sending excessive data, in each batch, each path sequence can be checked against the cutoff threshold at block 518 and only those path sequences with weights lower than the threshold are forwarded at block 520. For the same destination node, only the top-K incomplete path sequences are sent as a result at block 522 since non-top-K paths are dropped at block 520. The current cutoff threshold is also sent to inform the other servers on a current weight of the complete paths.

Figure 6:
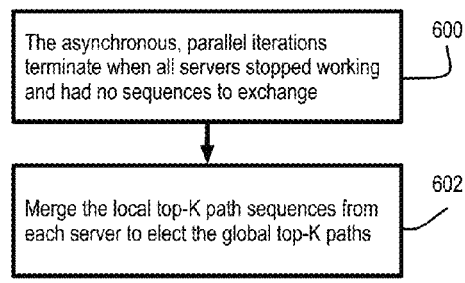
FIG. 6 is a flow diagram illustrating terminating conditions for an iterative parallel processing method to converge to a result according to an exemplary embodiment of the present disclosure.

Turning to FIG. 6, the asynchronous parallel processing and exchanging of incomplete paths among distributed servers reaches a result when all servers stop working on the query and have no further path sequences to exchange at block 600. This happens because the cutoff thresholds are gradually lowered to reflect the top-K paths completed. Then the locally found top-K paths are merged to find and return a set of global top-K paths at block 602.

Figure 7:
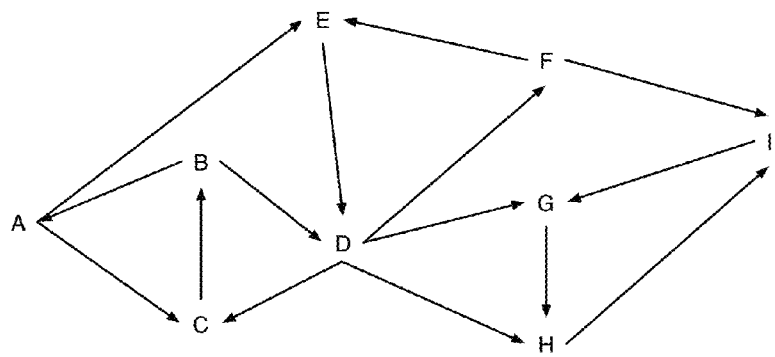
FIG. 7 is an illustrative example of a directed graph partitioned and managed by two computing servers according to an exemplary embodiment of the present disclosure.
Figure 8:
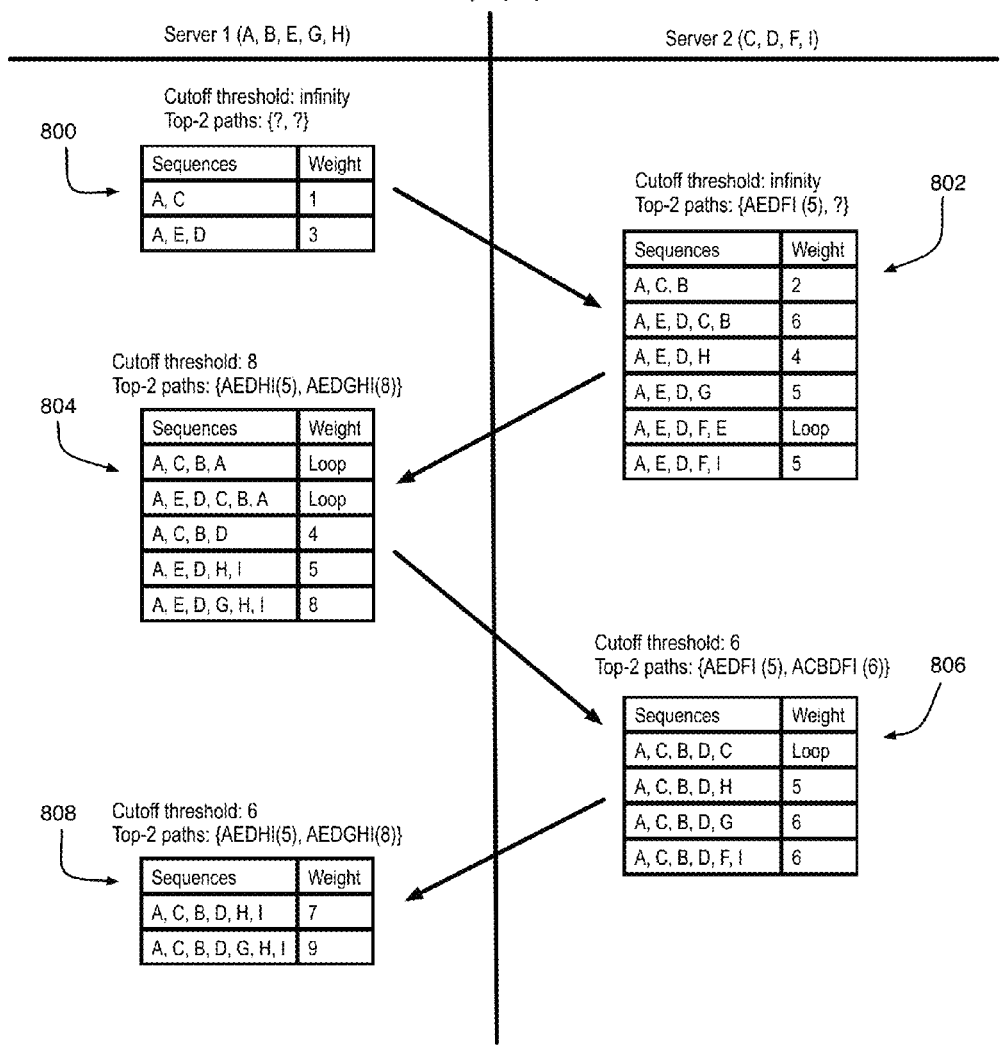
FIG. 8 illustrates an iterative method between the two computing servers of FIG. 7 to find top-2 paths from node A to node I in the graph shown in FIG. 7 according to an exemplary embodiment of the present disclosure.

The exemplary method described in FIG. 4 to FIG. 6 will now be illustrated with an example walkthrough with reference to FIG. 7 and FIG. 8. For simplicity of explanation, FIG. 7 depicts a directed graph partitioned and managed by two computing servers. Server 1 holds edge data about nodes A, B, E, G, and H. Server 2 holds data about nodes C, D, F, and I.

FIG. 8 illustrates an iterative asynchronous parallel processing method performed between the two computing servers to find the top-2 path sequences from node A to node I in the graph shown in FIG. 7. Since the queried source node A is held by Server 1, Server 1 looks up the incomplete path sequences (A,C) and (A,E,D) with weights 1 and 3, respectively at 800. Since nodes C and D are held by Server 2, Server 1 sends these two incomplete paths to Server 2, which subsequently looks up the next hop(s) from locally stored data at 802. Server 2 finds one loop (A,E,D,F,E) and discards it. Server 2 also finds four incomplete path sequences and one complete path sequence (A,E,D,F,I). For the complete path it found, Server 2 entered it to the top-2 path list locally maintained. Server 2 sends the four incomplete paths to Server 1.

Server 1 receives four incomplete paths and looked up their next hops at 804. Server 1 drops two loops and found two complete path sequences (A,E,D,H,I) and (A,E,D,G,H,I). Since two complete path sequences have been found, the cutoff threshold is updated to reflect the greater of the two at weight 8. Server 1 forwards the incomplete path sequence (A,C,B,D) and the threshold 8 to Server 2.

Server 2 finds one loop, two incomplete path sequences and one complete path sequence at 806. Server 2 has now found two complete path sequences and thus updated its top-2 list and threshold. Server 2 then sends (A,C,B,D,H) and (A,C,B,D,G) to Server 1. Server 1 also received the new threshold from Server 2 at 6.

Server 1 looks up two more complete path sequences but both exceeded the cutoff at 808 and dropped. Both servers now complete their work and do not have more path sequences to exchange. The local top-2 lists from the two servers are merged to get a result.

Another exemplary iterative asynchronous parallel processing method is described with reference to FIG. 9 to FIG. 13. The search operation is initiated in the different servers where a source node and a target node are stored in parallel. When a server receives a path sequence from another server, the direction of the search can be identified by determining whether a first node of the path sequence is the source node or the target node. Each server keeps information for the intermediate nodes that are reachable on the alternative paths between the source node and the target node. For each intermediate node stored in the local storage, each server keeps a list of top-K path sequences discovered from the source node to the intermediate node as well as a list of top-K path sequences discovered from the target node to the intermediate node. These different lists are used to discover new shortest paths between the source node and the target node. Once new shortest paths are discovered, the top-K shortest path list and the threshold are updated similar to the method described with reference to FIG. 8.

Figure 9:
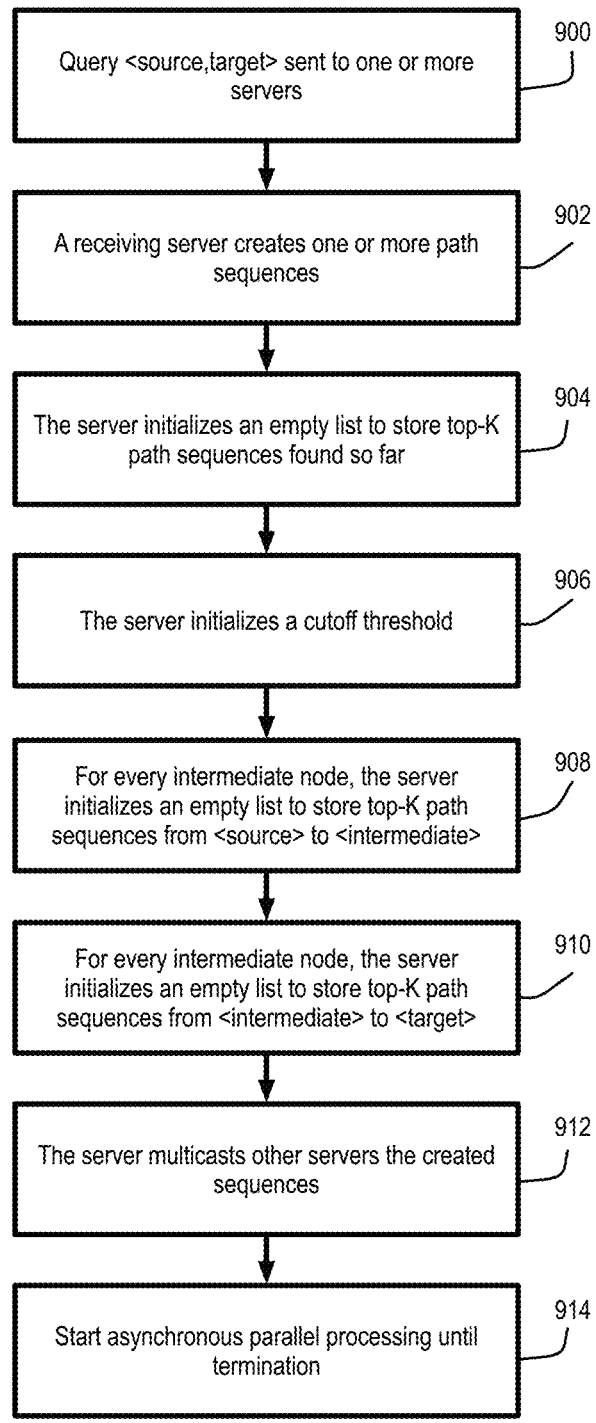
FIG. 9 illustrates an initialization of a parallel method executing from both source and target nodes according to an exemplary embodiment of the present disclosure.

Referring more particularly to FIG. 9 illustrating a flow diagram of an initialization method of a parallel method with multiple initialization points, the queried source node and target node are broadcasted to all of the servers holding the graph data at block 900. For a server that holds the edges originating directly from the source node, one or more path sequences can be created, initiating the search from the source node to the target node at block 902. Another server, which holds the edges directly reaching the target node, creates one or more path sequences, initiating the search in a reverse order, from the target node to the source node. Each of these servers then initializes an empty list to store the top-K path sequences found so far at block 904 and initializes a cutoff threshold, which is used to limit the number of path sequences to track, to infinity at block 906. For every intermediate node, the servers initialize one empty list to store top-K path sequences from the source node to intermediate nodes and another empty list to store top-K path sequences from the target node to the intermediate nodes at blocks 908 and 910. The servers then multicast the incomplete path sequences (e.g., the first hop) to other servers at block 912. The distributed processing system then initializes an asynchronous parallel processing at block 914.

Figure 10:
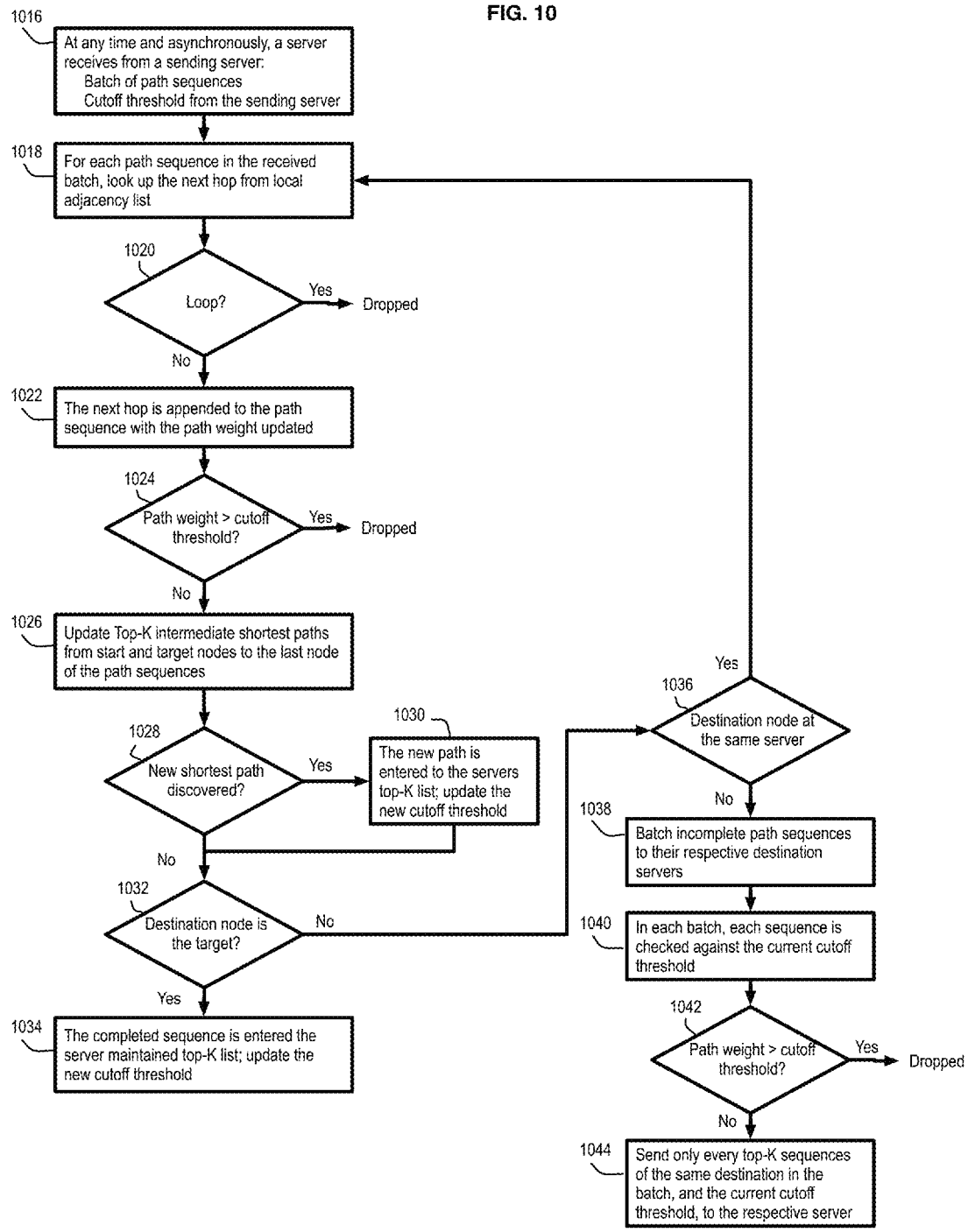
FIG. 10 illustrates an independently executed, iterative method for a computing server to append and update path sequences traversed from source or target nodes according to an exemplary embodiment of the present disclosure.

According to an exemplary embodiment of the present disclosure, an asynchronous parallel processing among servers has there is no set order on the execution operations among servers at runtime. A server can multicast a batch of incomplete path sequences to respective servers holding the downstream data once the batch is available. As shown in FIG. 10, at any time and asynchronously, a current server may receive a new batch of incomplete path sequences and a cutoff threshold from a remote sending server at block 1016. The incomplete paths can be initiated by either from the source node or the target node. A cutoff threshold of the current server is updated to be the lesser of the current threshold and the cutoff threshold of the sending server.

For each incomplete path sequence in the received batch, the current server looks up a next hop (edge) from a local adjacency list that it manages 1018. If the next hop destines to a node that has been visited before by the incomplete path, the path sequence has formed a loop and the extended path is dropped at block 1020. If not, the next hop is added at the end of the incomplete path sequence with its aggregated weight updated at block 1022. The updated path weight is checked against the threshold at block 1024. If it is determined that that updated path weight is greater than the threshold, the path sequence can be dropped. That is, an updated path weight greater than the threshold indicates that there are at least K other completed path sequences from source to target that have lower weights. The top-K intermediate shortest path sequences lists are updated as shorter path sequences from the source node and the target node to intermediate nodes at block 1026. The intermediate path sequences are checked as to whether they form a new path sequence from source to target node at block 1028. If a new shortest path sequence is discovered, the path sequence is entered to the server's top-K list at block 1030. The completed path sequence is entered to the server maintained top-K list if the destination node of the last hop is also the target node at block 1032. The cutoff threshold can be updated at block 1034. If it is determined that the destination node is not the target node but the current server manages its data at block 1036, the server continues to look up the next hop by iterating through blocks 1018 to 1032.

If the destination node's information is held by other servers, the current server batches the incomplete path sequences based on their next hops at block 1038. To avoid sending excessive data, in each batch, each path sequence is checked against the cutoff threshold at block 1040 and only path sequences with weights than the cutoff threshold are forwarded at block 1042. For the same destination node, only the top-K incomplete path sequences are sent since non-top-K path sequences will not be included in a result at block 1044. The current cutoff threshold is also sent to inform the other servers of a highest weight of the complete paths.

Figure 11:
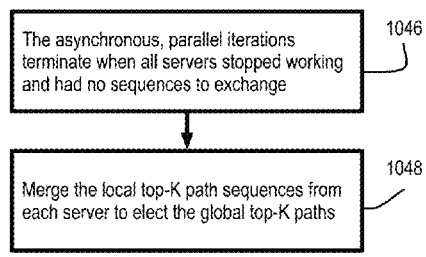
FIG. 11 is a flow diagram of terminating conditions for an independently executed, iterative method according to an exemplary embodiment of the present disclosure.

Turning to FIG. 11, the asynchronous parallel processing and exchanging of incomplete path sequences among distributed servers reaches a result when all servers stop working on the query and have no further path sequences to exchange at block 1046. This happens because the cutoff thresholds are gradually lowered to reflect the top-K paths completed. The locally found top-K path sequences are merged to find and return the global top-K paths at block 1048.

Figure 12:
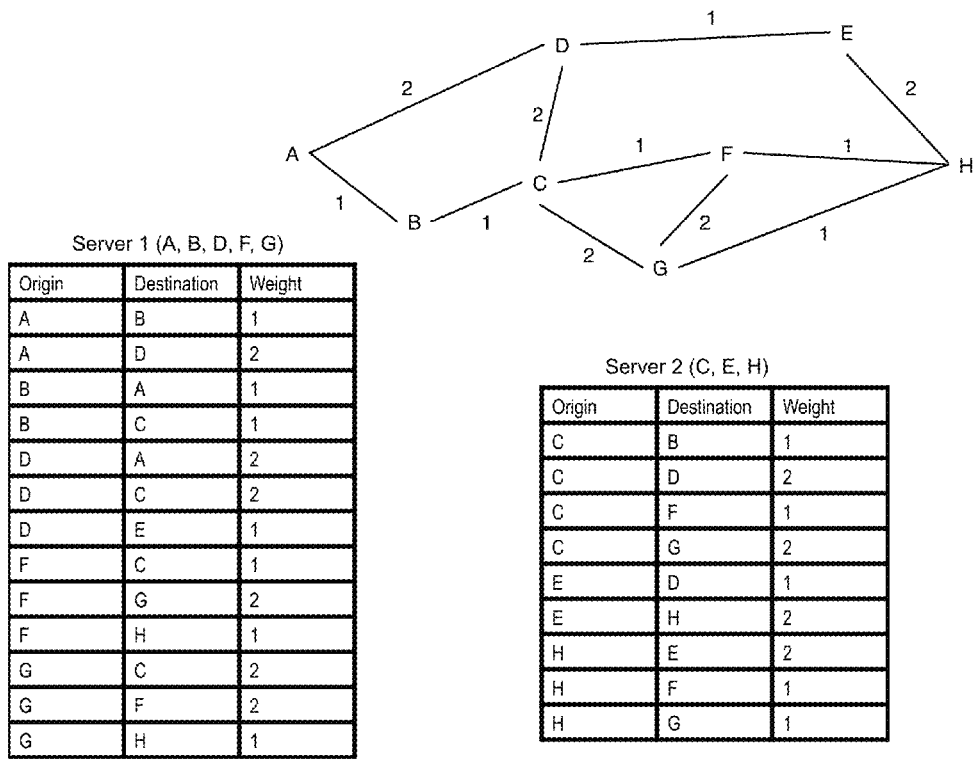
FIG. 12 is an illustrative example of a bidirectional graph partitioned and managed by two computing servers according to an exemplary embodiment of the present disclosure.

The exemplary method described in FIG. 9 to FIG. 11 will now be illustrated with an example walkthrough with reference to FIG. 12 and FIG. 13. For simplicity of explanation, FIG. 12 depicts a small, bidirectional graph partitioned and managed by two computing servers. Server 1 holds edge data about nodes A, B, D, F, and G. Server 2 holds data about nodes C, E, and H.

Figure 13A:
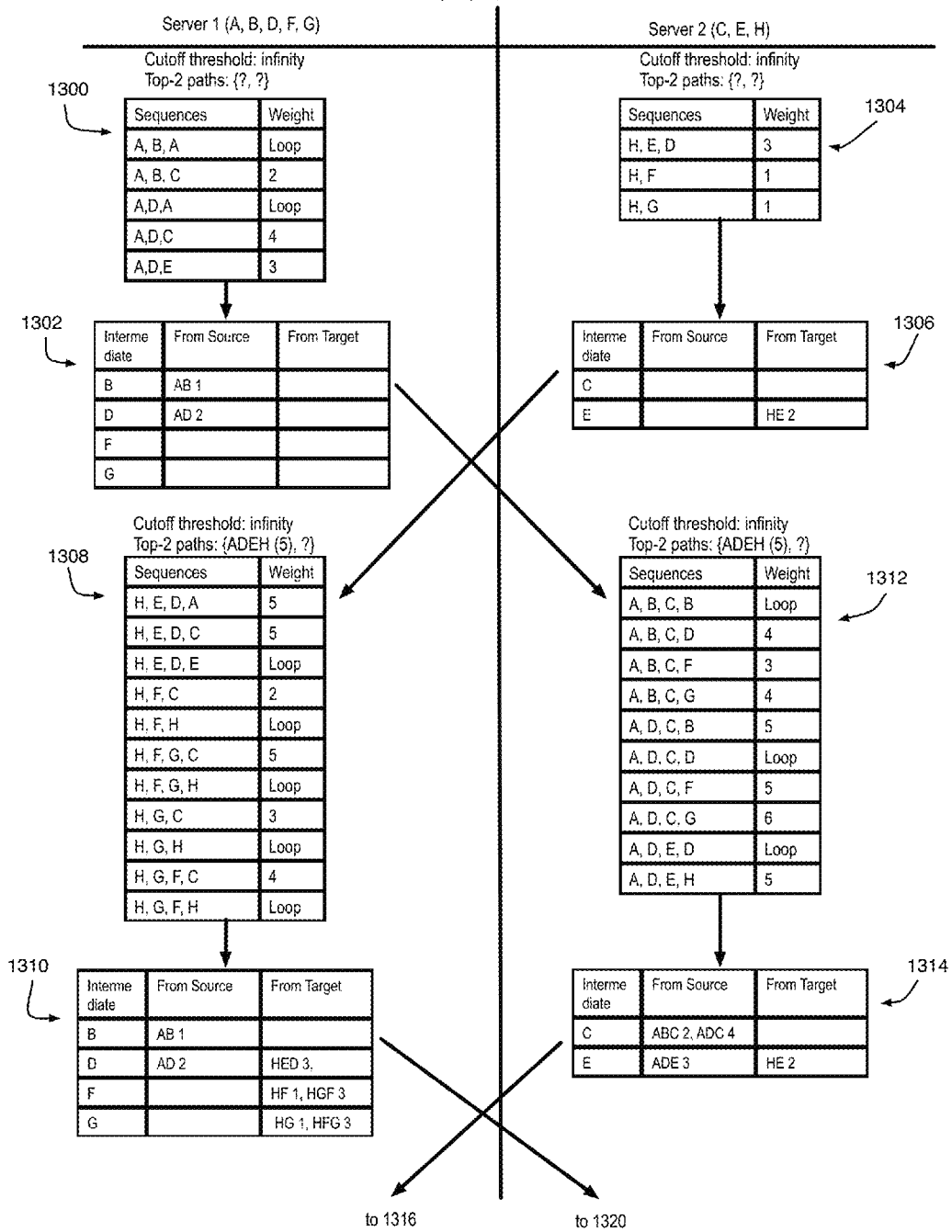
FIGS. 13A-B illustrates an iterative method between the two computing servers to find top-2 paths between node A and node H in the graph shown in FIG. 12 according to an exemplary embodiment of the present disclosure.
Figure 13B:
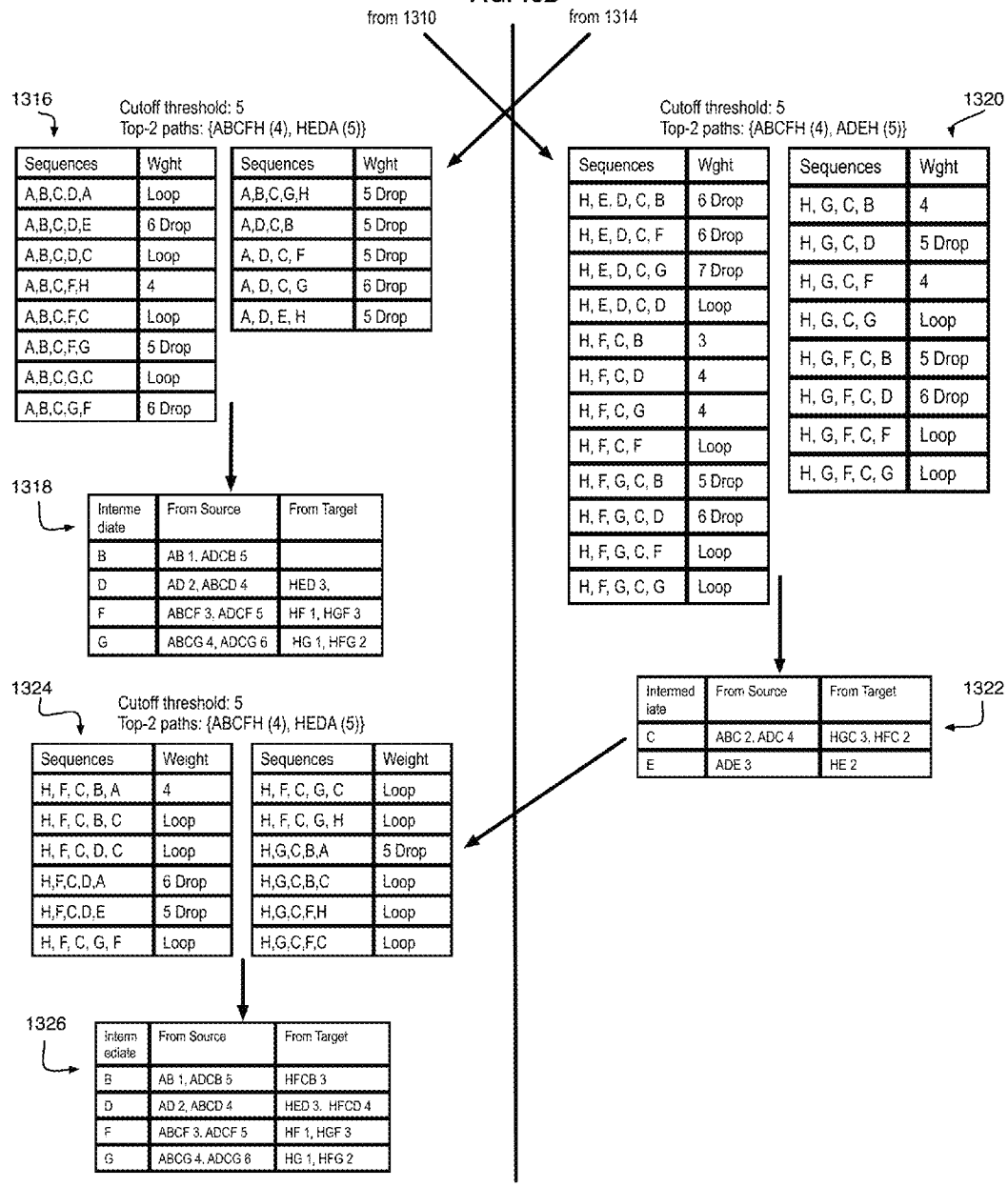

FIGS. 13A-B illustrate an iterative asynchronous parallel processing method performed between the two computing servers to find the top-2 paths from node A to node H in the graph shown in FIG. 12. Since the queried source node A is held by Server 1, Server 1 looks up the incomplete path sequences (A,B,C), (A,D,C) and (A,D,E) with weights 2, 4 and 3 respectively at 1300. Since the nodes C and E are held by Server 2, Server 1 sends these three incomplete path sequences to Server 2. The incomplete path sequences (A,B,A) and (A,D,A) are dropped since loops are detected in these incomplete paths. Server 1 also updates the top-2 intermediate shortest path sequences from source to the nodes B and D at 1302.

While Server 1 prepares the first batch of sequences to send, Server 2 initiates an inverse search from a target node to a source node as the target node H is held by Server 2. Server 2 looks up the incomplete path sequences (H,E,D), (H,F) and (H,G) with weights 3, 1 and 1 respectively at 1304. Since the nodes D, F and G are held by Server 1, Server 2 sends these incomplete path sequences to Server 1. Server 2 also updates the top-2 intermediate shortest path sequences from target to node E at 1306.

After receiving the three incomplete paths from Server 1, Server 2 subsequently looks up the next hop(s) from locally stored data at 1312. Server 2 finds a loop in the path sequences (A,B,C,B), (A,D,C,D, (A,D,E,D) and discards them. Server 2 also finds six incomplete path sequences and one complete path sequence (A,D,E,H). For the complete path sequence found, Server 2 enters it to the top-2 path list locally maintained. Server 2 then sends the six incomplete paths to Server 1. Server 2 also updates the top-2 intermediate shortest path sequences from source to the nodes C and E at 1314.

Server 1 receives three incomplete path sequences and looks up their next hops at 1308. Five incomplete path sequences (H,E,D,E), (H,F,H), (H,F,G,H), (H,G,H), (H,G,F, H) are dropped since loops are detected in these incomplete paths. One complete path sequence is discovered (H,E,D,A) and entered to the top-2 path list locally maintained. Remaining five incomplete path sequences (H,E,D,C), (H,F,C), (H,F,G,C), (H,G,C), (H,G,F,C) are sent to Server 2 for further processing. Server 1 also updates the top-2 intermediate shortest path sequences from target to nodes D, F and G at 1310.

Server 2 receives five incomplete paths from Server 1 and follows these paths. After updating the top-2 intermediate shortest paths a new path sequence from H to C is found (H,F,C), which has a weight of 2 at 1322. Server 2 already knows that there is a path sequence (A,B,C) from A to C with a total weight of 2. By combining these two intermediate path sequences, a new complete path ABCFH with a total weight of 4 is discovered. Since two complete path sequences (A,B,C,F,H), (A,D,E,H) have been found, the cutoff threshold is updated to reflect the greater of the two at weight 5. After following the incomplete path sequences received from Server 1, eight path sequences are dropped since the total weight of these path sequences exceeds the threshold. These path sequences are: (H,E,D,C,B), (H,E,D,C,F), (H,E,D,C,G), (H,F,G,C,B), (H,F,G,C,D), (H,G,C,D), (H,G,F,C,B), (H,G,F,C,D) at 1320. Also, seven path sequences are dropped since these path sequences contain a loop. These path sequences are (H,E,D,C,D), (H,F,C,F), (H,F,G,C,F), (H,F,G,C,G), (H,G,C,G), (H,G,F,C,F), (H,G,F,C,G). Five incomplete path sequences are sent to Server 1 together with the updated threshold value. These path sequences are: (H,F,C,B), (H,F,C,D), (H,F,C,G), (H,G,C,B), (H,G,C,F).

Server 1 receives six incomplete path sequences and looks up their next hops at 1316. One complete path sequence is discovered (A,B,C,F,H) with a total weight of 4. Since two complete path sequences (A,B,C,F,H), (H,E,D,A) have been found, the cutoff threshold is updated to reflect the greater of the two at weight 5. Eight path sequences are dropped since the total weight of these paths sequences exceed the threshold. These path sequences are: (A,B,C,D,E), (A,B,C,F,G), (A,B,C,G,F), (A,B,C,G,H), (A,D,C,B), (A,D,C,F), (A,D,C,G), (A,D,E,H). Also, four path sequences are dropped since these path sequences contain a loop. These path sequences are: (A,B,C,D,A), (A,B,C,D,C), (A,B,C,F,C), (A,B,C,G,C). Server 1 also updates the top-2 intermediate shortest path sequences from source to the nodes B, D, F and G at 1318. Server 1 stops sending messages as there is no path sequence to follow up.

Server 1 receives five incomplete path sequences from Server 2 at 1324. After following these path sequences one complete path sequence is discovered (H,F,C,B,A). However, this path sequence was already discovered in the reverse order and can be discarded. Three other path sequences are dropped since the total weight exceeds the threshold. These are: (H,F,C,D,A), (H,F,C,D,E), (H,G,C,B,A). Also eight path sequences are dropped since these path sequences contain a loop. These path sequences are: (H,F,C,B,C), (H,F,C,D,C), (H,F,C,G,F), (H,F,C,G,C), (H,F,C,G,H), (H,G,C,B,C), (H,G,C,F,H), (H,G,C,F,C).

Both servers have now completed their work and do not have more path sequences to exchange. The local top-2 lists from the two servers are merged to get a result.

The methodologies of embodiments of the disclosure may be particularly well-suited for use in an electronic device or alternative system. Accordingly, embodiments of the present disclosure may take the form of an entirely hardware embodiment or an embodiment combining software and hardware aspects that may all generally be referred to herein as a "processor", "circuit," "module" or "system." Furthermore, embodiments of the present disclosure may take the form of a computer program product embodied in one or more computer readable medium(s) having computer readable program code stored thereon.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

Computer program code for carrying out operations of embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present disclosure are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

For example, FIG. 14 is a block diagram depicting an exemplary computer system for detecting top-K simple shortest paths in a graph according to an embodiment of the present disclosure. The computer system shown in FIG. 14 includes a processor 1401, memory 1402, signal source 1403, system bus 1404, Hard Drive (HD) controller 1405, keyboard controller 1406, serial interface controller 1407, parallel interface controller 1408, display controller 1409, hard disk 1410, keyboard 1411, serial peripheral device 1412, parallel peripheral device 1413, and display 1414.

In these components, the processor 1401, memory 1402, signal source 1403, HD controller 1405, keyboard controller 1406, serial interface controller 1407, parallel interface controller 1408, display controller 1409 are connected to the system bus 1404. The hard disk 1410 is connected to the HD controller 1405. The keyboard 1411 is connected to the keyboard controller 1406. The serial peripheral device 1412 is connected to the serial interface controller 1407. The parallel peripheral device 1413 is connected to the parallel interface controller 1408. The display 1414 is connected to the display controller 1409.

In different applications, some of the components shown in FIG. 14 can be omitted. The whole system shown in FIG. 14 is controlled by computer readable instructions, which are generally stored in the hard disk 1410, EPROM or other non-volatile storage such as software. The software can be downloaded from a network (not shown in the figures), stored in the hard disk 1410. Alternatively, software downloaded from a network can be loaded into the memory 1402 and executed by the processor 1401 so as to complete the function determined by the software.

The processor 1401 may be configured to perform one or more methodologies described in the present disclosure, illustrative embodiments of which are shown in the above figures and described herein. Embodiments of the present disclosure can be implemented as a routine that is stored in memory 1402 and executed by the processor 1401 to process the signal from the signal source 1403. As such, the computer system is a general-purpose computer system that becomes a specific purpose computer system when executing the routine of the present disclosure.

Although the computer system described in FIG. 14 can support methods according to the present disclosure, this system is only one example of a computer system. Those skilled of the art should understand that other computer system designs can be used to implement the present invention.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to a multi-core processor that contains multiple processing cores in a processor or more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the disclosure is not limited to those precise embodiments, and that various other changes and modifications may be made therein by one skilled in the art without departing from the scope of the appended claims.

What is claimed is:

1. A method for determining a portion of a path in a distributed network of nodes between a source node and a target node, wherein graph data representing a portion of a topology of the distributed network of nodes is stored by a computing server, the method comprising: receiving a batch of incomplete path sequences between the source node and the target node; receiving a current cutoff threshold; updating the current cutoff threshold upon determining that a local cutoff threshold of the computing server is less than the current cutoff threshold, wherein the current cutoff threshold is updated to take a value of the local cutoff threshold; removing each of the incomplete path sequences containing a loop from the batch of incomplete path sequences to determine an updated batch; appending a looked up edge to the updated batch upon determining that a total path weight of the updated batch is less than the current cutoff threshold to determine an appended batch; and outputting the updated batch to at least one additional computing server storing graph data representing an additional portion of the topology of the distributed network of nodes.

2. The method of claim 1, wherein outputting the updated batch further comprises communicating with the at least one additional computing server via a communication switch.

3. The method of claim 1, wherein outputting the updated batch further comprises: mapping a node identification of at least one last node of the updated batch of incomplete path sequences to a respective server that holds edge data associated with the node identification, wherein the at least one additional computer server includes the respective server; and multicasting the updated batch to the respective server.

4. The method of claim 1, performed in parallel by at least one parallel computing server.

5. The method of claim 1, wherein the graph data of the computing server is non-overlapping with graph data of the at least one additional computing server.

6. The method of claim 1, further comprising receiving an adjacency list data structure encoding edge data of the graph data representing the topology of the distributed network of nodes.

7. The method of claim 6, wherein the computing server knows the edge data that the at least one additional computing server manages.

8. A method for determining a path in a distributed network of nodes, wherein graph data representing a topology of the distributed network of nodes is partitioned and stored among a plurality of computing servers connected via communication switches, the method comprising: initializing a search, in response to a query specifying a source node and a target node in the disturbed network of nodes, at an initial computing server storing a portion of the graph data corresponding to the source node; determining, by the plurality of computing servers, a plurality of path sequences forming the path between the source node and the target node, each of the plurality of computing servers, excluding a terminating computing server, determining at least one path sequence between at least two immediate neighboring nodes along the path; and sending the at least one path sequence to at least one additional computing server of the plurality of computing servers storing a respective portion of the graph data between the source node toward the target node upon determining that a path weight of the at least one path sequence is smaller than a cutoff threshold; and determining, by the terminating computing server, at least one path sequence directly to the target node given the at least one path sequence of at least one previous computing server and wherein determining, by the plurality of computing servers, the plurality of path sequences forming the path further comprises: receiving, at each of the plurality of computing servers, a batch of incomplete path sequences including the at least one path sequence and a current cutoff threshold; and removing each of the incomplete path sequences containing a loop from the batch of incomplete path sequences to determine an updated batch and further comprising: appending a looked up edge to the updated batch upon determining that a total path weight of the updated batch is less than the current cutoff threshold to determine an appended batch; updating a list of path sequences upon determining that the path sequences of the appended batch reaches the target node; and exiting upon determining that none of the plurality computing servers have more sequences to exchange and merge into the list of path sequences and outputting the list of path sequences as the path.

9. The method of claim 8, wherein determining, by the plurality of computing servers, the plurality of path sequences forming the path further comprises: updating the current cutoff threshold upon determining that a local cutoff threshold of the at least one additional computing server is less than the current cutoff threshold, wherein the current cutoff threshold is updated to take a value of the local cutoff threshold.

10. The method of claim 8, wherein sending the at least one path sequence to the at least one additional computing server of the plurality of computing servers storing the respective portion of the graph data between the source node toward the target node further comprises: mapping a node identification of at least one last node of the at least one path sequence to a respective computing server that holds edge data associated with the node identification, wherein the at least one additional computing server includes the respective computing server; and multicasting the updated batch to the respective computing server.

11. The method of claim 8, wherein at least two of the plurality of computer servers determine respective path sequences in parallel.

12. The method of claim 8, wherein the graph data of each of the plurality of computer servers is non-overlapping.

13. The method of claim 8, further comprising receiving an adjacency list data structure encoding edge data of the graph data representing the topology of the distributed network of nodes.

14. The method of claim 13, wherein each of the plurality of computing server knows the edge data that each other computing server manages.

15. A method for determining a top-K simple shortest path in a distributed network of nodes, wherein graph data representing a topology of the distributed network of nodes is partitioned and stored among a plurality of computing servers connected via communication switches, the method comprising: receiving a query specifying a source node and a target node in the disturbed network of nodes; initializing a search in response to the query at an initial computing server storing a portion of the graph data corresponding to the source node; determining at least one path sequence directly from the source node to its direct, immediate neighboring nodes; and sending the at least one path sequence to at least one additional computing server storing a respective portion of the graph data between the source node toward the target node upon determining that a path weight of the at least one path sequence is smaller than a cutoff threshold; for each additional computing server, in parallel, receiving a batch of incomplete path sequences including the at least one path sequence and a current cutoff threshold; updating the current cutoff threshold upon determining that a local cutoff threshold of the at least one additional computing server is less than the current cutoff threshold, wherein the current cutoff threshold is updated to take a value of the local cutoff threshold; removing each of the incomplete path sequences containing a loop from the batch of incomplete path sequences to determine an updated batch; appending a looked up edge to the updated batch upon determining that a total path weight of the updated batch is less than the current cutoff threshold to determine an appended batch; updating a top-K list of path sequences upon determining that the path sequences of the appended batch reaches the target node; and exiting upon determining that none of the additional computing servers have more sequences to exchange and merge into the top-K list of path sequences and outputting the top-K list of path sequences.

16. A computer program product for determining a portion of a path in a distributed network of nodes between a source node and a target node, wherein graph data representing a portion of a topology of the distributed network of nodes is stored by the computer program product, the computer program product comprising: a non-transitory computer readable storage medium having computer readable program code embodied therewith, the computer readable program code comprising: computer readable program code configured to receive a batch of incomplete path sequences between the source node and the target node and a current cutoff threshold; computer readable program code configured to update the current cutoff threshold upon determining that a local cutoff threshold of the computer program product is less than the current cutoff threshold, wherein the current cutoff threshold is updated to take a value of the local cutoff threshold; computer readable program code configured to remove each of the incomplete path sequences containing a loop from the batch of incomplete path sequences to determine an updated batch; computer readable program code configured to append a looked up edge to the updated batch upon determining that a total path weight of the updated batch is less than the current cutoff threshold to determine an appended batch; and computer readable program code configured to output the updated batch to at least one additional computer program product storing graph data representing an additional portion of the topology of the distributed network of nodes.

17. The computer program product of claim 16, wherein the computer program product is connected to the at least one additional computer program product via a communication switch.

18. The computer program product of claim 16, wherein outputting the updated batch further comprises: mapping a node identification of at least one last node of the updated batch of incomplete path sequences to a respective server that holds edge data associated with the node identification, wherein the at least one additional computer server includes the respective server; and multicasting the updated batch to the respective server.

19. The computer program product of claim 16, performed in parallel by at least one parallel computing server.

20. The computer program product of claim 16, wherein the graph data of the computing server is non-overlapping with graph data of the at least one additional computing server.

21. The computer program product of claim 16, further comprising receiving an adjacency list data structure encoding edge data of the graph data representing the topology of the distributed network of nodes.

22. The computer program product of claim 21, wherein the computing server knows the edge data that the at least one additional computing server manages.

23. A computer program product for determining a path in a distributed network of nodes, wherein graph data representing a topology of the distributed network of nodes is partitioned and stored among a plurality of computing servers connected via communication switches, the computer program product comprising: a non-transitory computer readable storage medium having computer readable program code embodied therewith, the computer readable program code comprising: computer readable program code configured to initialize a search, in response to a query specifying a source node and a target node in the disturbed network of nodes, at an initial computing server of the plurality of computing servers, the initial computer server storing a portion of the graph data corresponding to the source node; computer readable program code configured to determine, by the plurality of computing servers, a plurality of path sequences forming the path between the source node and the target node, each of the plurality of computing servers, excluding a terminating computing server of the plurality of computing servers, determining at least one path sequence between at least two immediate neighboring nodes along the path; and sending the at least one path sequence to at least one additional computing server of the plurality of computing servers storing a respective portion of the graph data between the source node toward the target node upon determining that a path weight of the at least one path sequence is smaller than a cutoff threshold; and computer readable program code configured to determine, by the terminating computing server, at least one path sequence directly to the target node given the at least one path sequence of at least one previous computing server and wherein computer readable program code configured to determine, by the plurality of computing servers, the plurality of path sequences forming the path further comprises: computer readable program code configured to receive, at each of the plurality of computing servers, a batch of incomplete path sequences including the at least one path sequence and a current cutoff threshold; computer readable program code configured to update the current cutoff threshold upon determining that a local cutoff threshold of the at least one additional computing server is less than the current cutoff threshold, wherein the current cutoff threshold is updated to take a value of the local cutoff threshold; and computer readable program code configured to remove each of the incomplete path sequences containing a loop from the batch of incomplete path sequences to determine an updated batch.

24. The computer program product of claim 23, further comprising: computer readable program code configured to append a looked up edge to the updated batch upon determining that a total path weight of the updated batch is less than the current cutoff threshold to determine an appended batch; computer readable program code configured to update a list of path sequences upon determining that the path sequences of the appended batch reaches the target node; and computer readable program code configured to exit upon determining that none of the plurality computing servers have more sequences to exchange and merge into the list of path sequences and outputting the list of path sequences as the path.

25. The computer program product of claim 23, wherein sending the at least one path sequence to the at least one additional computing server of the plurality of computing servers storing the respective portion of the graph data between the source node toward the target node further comprises: computer readable program code configured to map a node identification of at least one last node of the at least one path sequence to a respective computing server that holds edge data associated with the node identification, wherein the at least one additional computing server includes the respective computing server; and computer readable program code configured to multicast the updated batch to the respective computing server.

26. The computer program product of claim 23, wherein at least two of the plurality of computer servers determine respective path sequences in parallel.

27. The computer program product of claim 23, wherein the graph data of each of the plurality of computer servers is non-overlapping.

28. The computer program product of claim 23, further comprising computer readable program code configured to receive an adjacency list data structure encoding edge data of the graph data representing the topology of the distributed network of nodes.

29. The computer program product of claim 23, wherein each of the plurality of computing server knows the edge data that each other computing server manages.

30. A computer program product for determining a top-K simple shortest path in a distributed network of nodes, wherein graph data representing a topology of the distributed network of nodes is partitioned and stored among a plurality of computing servers connected via communication switches, the computer program product comprising: a non-transitory computer readable storage medium having computer readable program code embodied therewith, the computer readable program code comprising: computer readable program code configured to receive a query specifying a source node and a target node in the disturbed network of nodes; computer readable program code configured to initialize a search in response to the query at an initial computing server of the plurality of computing servers, the initial computer server storing a portion of the graph data corresponding to the source node; computer readable program code configured to determine at least one path sequence directly from the source node to its direct, immediate neighboring nodes; and computer readable program code configured to send the at least one path sequence to at least one additional computing server storing a respective portion of the graph data between the source node toward the target node upon determining that a path weight of the at least one path sequence is smaller than a cutoff threshold; for each additional computing server, in parallel, receiving a batch of incomplete path sequences including the at least one path sequence and a current cutoff threshold; updating the current cutoff threshold upon determining that a local cutoff threshold of the at least one additional computing server is less than the current cutoff threshold, wherein the current cutoff threshold is updated to take a value of the local cutoff threshold; removing each of the incomplete path sequences containing a loop from the batch of incomplete path sequences to determine an updated batch; appending a looked up edge to the updated batch upon determining that a total path weight of the updated batch is less than the current cutoff threshold to determine an appended batch; updating a top-K list of path sequences upon determining that the path sequences of the appended batch reaches the target node; and exiting upon determining that none of the additional computing servers have more sequences to exchange and merge into the top-K list of path sequences and outputting the top-K list of path sequences.

* * * * *